US011638904B2

(12) United States Patent
Glover et al.

(10) Patent No.: US 11,638,904 B2
(45) Date of Patent: May 2, 2023

(54) POROUS MEMBRANE ENCAPSULATED PELLET AND METHOD FOR ITS PREPARATION

(71) Applicants: Thomas Grant Glover, Spanish Fort, AL (US); Stephen Michael Christopher Ritchie, Northport, AL (US)

(72) Inventors: Thomas Grant Glover, Spanish Fort, AL (US); Stephen Michael Christopher Ritchie, Northport, AL (US)

(73) Assignees: The University of South Alabama, Mobile, AL (US); The Board of Trustees of The University of Alabama, Tuscaloosa, AL (US)

( * ) Notice: Subject to any disclaimer, the term of this patent is extended or adjusted under 35 U.S.C. 154(b) by 225 days.

(21) Appl. No.: 17/121,974

(22) Filed: Dec. 15, 2020

(65) Prior Publication Data
US 2021/0178339 A1 Jun. 17, 2021

Related U.S. Application Data

(60) Provisional application No. 62/974,677, filed on Dec. 16, 2019.

(51) Int. Cl.
*B01D 53/22* (2006.01)
*B01D 69/14* (2006.01)
(Continued)

(52) U.S. Cl.
CPC ........... *B01D 69/141* (2013.01); *B01D 53/08* (2013.01); *B01D 53/1475* (2013.01);
(Continued)

(58) Field of Classification Search
CPC ............ B01D 67/0002; B01D 2325/14; B01D 53/1475; B01D 69/141; B01D 53/08; B01D 2325/02; B01J 20/262; B01J 20/226
See application file for complete search history.

(56) References Cited

U.S. PATENT DOCUMENTS 4,063,900 A 12/1977 Mita et al.
4,760,857 A * 8/1988 Shiba ...................... B41F 35/04
134/144
(Continued)

OTHER PUBLICATIONS

Wang, X.; Ma, X.; Schwartz, V.; Clark, J. C.; Overbury, S. H.; Zhao, S.; Xu, X.; Song, C. A Solid Molecular Basket Sorbent for CO 2 Capture from Gas Streams with Low CO 2 Concentration under Ambient Conditions. Phys. Chem. Chem. Phys. 2012, 14 (4), 1485-1492. https://doi.org/10.1039/C1CP23366A.
(Continued)

*Primary Examiner* — Anthony R Shumate
(74) *Attorney, Agent, or Firm* — Foryt Patent Services LLC; John P. Foryt; James H. Adams

(57) ABSTRACT

A method of encapsulating an engineered pellet in a porous membrane is disclosed. The method includes the steps of: (i) dissolving a membrane solute in a membrane solvent to produce a membrane solution; (ii) applying the membrane solution to a pellet to form a pellet encapsulated with the membrane solution; (iii) subjecting the membrane solution that encapsulates the pellet to a phase inversion and; (iv) drying the pellet to form a porous membrane encapsulated pellet. A porous membrane encapsulated pellet is also described.

18 Claims, 10 Drawing Sheets

UiO-66 pellet as pressed without binder (left) and UiO-66 pellet coated in Matrimid polymer to increase pellet mechanical integrity. Scale-bar shown is in centimeters.

(51) Int. Cl.
*B01D 53/08* (2006.01)
*B01J 20/22* (2006.01)
*B01D 53/14* (2006.01)
*B01D 67/00* (2006.01)
*B01J 20/26* (2006.01)

(52) U.S. Cl.
CPC ........ *B01D 67/0002* (2013.01); *B01J 20/226* (2013.01); *B01J 20/262* (2013.01); *B01D 2325/02* (2013.01); *B01D 2325/14* (2013.01)

(56) References Cited

U.S. PATENT DOCUMENTS

| | | | | |
|---|---|---|---|---|
| 5,567,441 | A * | 10/1996 | Chen | A61K 31/554 514/963 |
| 6,015,609 | A * | 1/2000 | Chaouk | B01D 71/32 528/495 |
| 6,060,530 | A * | 5/2000 | Chaouk | B01D 71/32 521/64 |
| 6,093,236 | A | 7/2000 | Klabunde et al. | |
| 6,215,651 | B1* | 4/2001 | Takada | H01G 9/0425 361/523 |
| 6,364,938 | B1 | 4/2002 | Birbara et al. | |
| 7,179,382 | B2 | 2/2007 | Hiltzik et al. | |
| 7,910,732 | B2 | 3/2011 | Schubert et al. | |
| 9,078,922 | B2 | 7/2015 | Yaghi et al. | |
| 9,278,319 | B2 | 3/2016 | Hoek et al. | |
| 2002/0086307 | A1* | 7/2002 | Amin | G01N 33/551 435/7.1 |
| 2003/0038391 | A1* | 2/2003 | Meyering | B01D 67/0009 425/141 |
| 2003/0154857 | A1 | 8/2003 | Murdoch | |
| 2004/0240345 | A1* | 12/2004 | Yoshioka | G11B 27/24 369/47.27 |
| 2007/0122609 | A1 | 5/2007 | Hiltzik et al. | |
| 2009/0223482 | A1* | 9/2009 | Schmitz | F02B 41/06 123/311 |
| 2012/0310018 | A1* | 12/2012 | Lai | B01D 69/10 585/818 |
| 2014/0051774 | A1* | 2/2014 | Shimoda | B01F 23/405 430/113 |
| 2014/0311977 | A1* | 10/2014 | Pink | B01D 11/0415 210/638 |
| 2015/0266010 | A1 | 9/2015 | Bazer-Bachi et al. | |
| 2015/0283516 | A1* | 10/2015 | Amstoutz | B01L 9/52 210/321.78 |
| 2016/0030893 | A1* | 2/2016 | Lind | B01D 67/0079 210/500.25 |
| 2017/0263908 | A1 | 9/2017 | Laicer et al. | |
| 2018/0147527 | A1 | 5/2018 | Tajima et al. | |
| 2019/0128883 | A1* | 5/2019 | Nur | B01D 71/44 |
| 2020/0206695 | A1* | 7/2020 | Aljundi | B01D 69/148 |
| 2021/0008523 | A1* | 1/2021 | Coignet | B01J 20/3042 |
| 2021/0113971 | A1* | 4/2021 | Aljundi | B01D 69/12 |

OTHER PUBLICATIONS

Mattox, E. M.; Knox, J. C.; Bardot, D. M. Carbon Dioxide Removal System for Closed Loop Atmosphere Revitalization, Candidate Sorbents Screening and Test Results. Acta Astronautica 2013, 86, 39-46. https://doi.org/10.1016/J.ACTAASTRO.2012.09.019.

Birbara, P. J.; Filburn, T. P.; Michels, H. H.; Nalette, T. A. Sorbent System and Method for Absorbing Carbon Dioxide (CO2) from the Atmosphere of a Closed Habitable Environment. U.S. Pat. No. 6,364,938 B1, Aug. 17, 2000.

Rao, A. B.; Rubin, E. S. A Technical, Economic, and Environmental Assessment of Amine-Based CO 2 Capture Technology for Power Plant Greenhouse Gas Control. Environmental Science & Technology 2002, 36 (20), 4467-4475. https://doi.org/10.1021/es0158861.

Abu-Zahra, M. R. M.; Schneiders, L. H. J.; Niederer, J. P. M.; Feron, P. H. M.; Versteeg, G. F. CO2 Capture from Power Plants: Part I. A Parametric Study of the Technical Performance Based on Monoethanolamine. International Journal of Greenhouse Gas Control 2007, 1 (1), 37-46. https://doi.org/10.1016/S1750-5836(06)00007-7.

Ho, M. T.; Allinson, G. W.; Wiley, D. E. Reducing the Cost of CO 2 Capture from Flue Gases Using Membrane Technology. Industrial & Engineering Chemistry Research 2008, 47 (5), 1562-1568. https://doi.org/10.1021/ie070541y.

Ishibashi, M.; Ota, H.; Akutsu, N.; Umeda, S.; Tajika, M.; Izumi, J.; Yasutake, A.; Kabata, T.; Kageyama, Y. Technology for Removing Carbon Dioxide from Power Plant Flue Gas by the Physical Adsorption Method. Energy Conversion and Management 1996, 37 (6), 929-933. https://doi.org/10.1016/0196-8904(95)00279-0.

Choi, S.; Drese, J. H.; Jones, C. W. Adsorbent Materials for Carbon Dioxide Capture from Large Anthropogenic Point Sources. ChemSusChem 2009, 2 (9), 796-854. https://doi.org/10.1002/cssc.200900036.

Chaffee, A. L.; Knowles, G. P.; Liang, Z.; Zhang, J.; Xiao, P.; Webley, P. A. CO2 Capture by Adsorption: Materials and Process Development. International Journal of Greenhouse Gas Control 2007, 1 (1), 11-18. https://doi.org/10.1016/S1750-5836(07)00031-X.

Yazaydin, A. O.; Snurr, R. Q.; Park, T.-H.; Koh, K.; Liu, J.; LeVan, M. D.; Benin, A. I.; Jakubczak, P.; Lanuza, M.; Calloway, D. B.; et al. Screening of Metal-Organic Frameworks for Carbon Dioxide Capture from Flue Gas Using a Combined Experimental and Modeling Approach. Journal of the American Chemical Society 2009, 131 (51), 18198-18199. https://doi.org/10.1021/ja9057234.

Hedin, N.; Chen, L.; Laaksonen, A. Sorbents for CO2 Capture from Flue Gas—Aspects from Materials and Theoretical Chemistry. Nanoscale 2010, 2 (10), 1819. https://doi.org/10.1039/c0nr00042f.

D'Alessandro, D. M.; Smit, B.; Long, J. R. Carbon Dioxide Capture: Prospects for New Materials. Angewandte Chemie International Edition 2010, 49 (35), 6058-6082. https://doi.org/10.1002/anie.201000431.

Gomes, V. G.; Yee, K. W. K. Pressure Swing Adsorption for Carbon Dioxide Sequestration from Exhaust Gases. Separation and Purification Technology 2002, 28 (2), 161-171. https://doi.org/10.1016/S1383-5866(02)00064-3.

Liu, Z.; Wang, L.; Kong, X.; Li, P.; Yu, J.; Rodrigues, A. E. Onsite CO 2 Capture from Flue Gas by an Adsorption Process in a Coal-Fired Power Plant. Industrial & Engineering Chemistry Research 2012, 51 (21), 7355-7363. https://doi.org/10.1021/ie3005308.

Xiao, P.; Zhang, J.; Webley, P.; Li, G.; Singh, R.; Todd, R. Capture of CO2 from Flue Gas Streams with Zeolite 13X by Vacuum Pressure Swing Adsorption. Adsorption 2008, 14 (4-5), 575 582. https://doi.org/10.1007/s10450-008-9128-7.

Zhang, J.; Webley, P. A. Cycle Development and Design for CO 2 Capture from Flue Gas by Vacuum Swing Adsorption Environmental Science & Technology 2008, 42 (2), 563-569. https://doi.org/10.1021/es0706854.

Fostås, B.; Gangstad, A.; Nenseter, B.; Pedersen, S.; Sjøvoll, M.; Sørensen, A. L. Effects of NOx in the Flue Gas Degradation of MEA. Energy Procedia 2011, 4, 1566-1573. https://doi.org/10.1016/j.egypro.2011.02.026.

Krishnamurthy, S.; Rao, V. R.; Guntuka, S.; Sharratt, P.; Haghpanah, R.; Rajendran, A.; Amanullah, M.; Karimi, I. A.; Farooq, S. CO 2 Capture from Dry Flue Gas by Vacuum Swing Adsorption: A Pilot Plant Study. AIChE Journal 2014, 60 (5), 1830-1842. https://doi.org/10.1002/aic.14435.

Cmarik, G. E.; Son, K. N.; Knox, J. C. Standard Isotherm Fit Information for Dry CO2 on Sorbents for 4-Bed Molecular Sieve; NASA/TM-2017-219847, M-1450; NASA Marshall Space Flight Center: Huntsville, AL, United States, 2017.

Bazer-Bachi, D.; Assié, L.; Lecocq, V.; Harbuzaru, B.; Falk, V. Towards Industrial Use of Metal-Organic Framework Impact of Shaping on the MOF Properties. Powder Technology 2014, 255, 52-59. https://doi.org/10.1016/J.POWTEC.2013.09.013.

Akhtar, F.; Andersson, L.; Ogunwumi, S.; Hedin, N.; Bergström, L. Structuring Adsorbents and Catalysts by Processing of Porous Powders. Journal of the European Ceramic Society 2014, 34 (7), 1643-1666. https://doi.org/10.1016/j.jeurceramsoc.2014.01.008.

(56) References Cited

OTHER PUBLICATIONS

Zacher, D.; Shekhah, O.; Wöll, C.; Fischer, R. A. Thin Films of Metal-Organic Frameworks. Chem. Soc. Rev. 2009, 38 (5), 1418-1429. https://doi.org/10.1039/B805038B.

Ren, J.; Langmi, H. W.; North, B. C.; Mathe, M. Review on Processing of Metal-Organic Framework (MOF) Materials towards System Integration for Hydrogen Storage. International Journal of Energy Research 2015, 39 (5), 607-620. https://doi.org/10.1002/er.3255.

Bétard, A.; Fischer, R. A. Metal-Organic Framework Thin Films: From Fundamentals to Applications. Chem. Rev. 2012, 112 (2), 1055-1083. https://doi.org/10.1021/cr200167v.

Shekhah, O.; Liu, J.; Fischer, R. A.; Wöll, C. MOF Thin Films: Existing and Future Applications. Chem. Soc. Rev. 2011, 40 (2), 1081-1106. https://doi.org/10.1039/C0CS00147C.

Ren, J.; Musyoka, N. M.; Langmi, H. W.; Swartbooi, A.; North, B. C.; Mathe, M. A More Efficient Way to Shape Metal-Organic Framework (MOF) Powder Materials for Hydrogen Storage Applications. International Journal of Hydrogen Energy 2015, 40 (13), 4617-4622. https://doi.org/10.1016/j.ijhydene.2015.02.011.

Finsy, V.; Ma, L.; Alaerts, L.; De Vos, D. E.; Baron, G. V.; Denayer, J. F. M. Separation of CO2/CH4 Mixtures with the MIL-53(Al) Metal-Organic Framework. Microporous and Mesoporous Materials 2009, 120 (3), 221-227. https://doi.org/10.1016/J.MICROMESO.2008.11.007.

Kim, S.-N.; Lee, Y.-R.; Hong, S.-H.; Jang, M.-S.; Ahn, W.-S. Pilot-Scale Synthesis of a Zirconium-Benzenedicarboxylate UiO-66 for CO2 Adsorption and Catalysis. Catalysis Today 2015, 245, 54-60. https://doi.org/10.1016/J.CATTOD.2014.05.041.

Peterson, G. W.; DeCoste, J. B.; Glover, T. G.; Huang, Y.; Jasuja, H.; Walton, K. S. Effects of Pelletization Pressure on the Physical and Chemical Properties of the Metal-Organic Frameworks Cu3(BTC)2 and UiO-66. Microporous and Mesoporous Materials 2013, 179, 48-53. https://doi.org/10.1016/J.MICROMESO.2013.02.025.

Doonan, C. J.; Tranchemontagne, D. J.; Glover, T. G.; Hunt, J. R.; Yaghi, O. M. Exceptional Ammonia Uptake by a Covalent Organic Framework Nat Chem 2010, 2 (3), 235-238. https://doi.org/10.1038/nchem.548.

Guillen, G. R.; Pan, Y.; Li, M.; Hoek, E. M. V. Preparation and Characterization of Membranes Formed by Nonsolvent Induced Phase Separation: A Review. Industrial & Engineering Chemistry Research 2011, 50 (7), 3798-3817. https://doi.org/10.1021/ie101928r.

Seoane, B.; Coronas, J.; Gascon, I.; Benavides, M. E.; Karvan, O.; Caro, J.; Kapteijn, F.; Gascon, J. Metal-Organic Framework Based Mixed Matrix Membranes: A Solution for Highly Efficient CO 2 Capture? Chemical Society Reviews 2015, 44 (8), 2421 2454. https://doi.org/10.1039/C4CS00437J.

Jasuja, H. Developing Design Criteria and Scale up Methods for Water-Stable Metal-Organic Frameworks for Adsorption Applications, Georgia Institute of Technology: Atlanta, Georgia, USA, 2014.

Burtch, N. C.; Jasuja, H.; Walton, K. S. Water Stability and Adsorption in Metal-Organic Frameworks. Chem. Rev. 2014, 114 (20), 10575-10612. https://doi.org/10.1021/cr5002589.

Shearer, G. C.; Chavan, S.; Bordiga, S.; Svelle, S.; Olsbye, U.; Lillerud, K. P. Defect Engineering: Tuning the Porosity and Composition of the Metal-Organic Framework UiO-66 via Modulated Synthesis. Chemistry of Materials 2016, 28 (11), 3749-3761. https://doi.org/10.1021/acs.chemmater.6b00602.

Watson, D.; Knox, J. C.; West, P.; Bush, R. Sorbent Structural Testing on Carbon Dioxide Removal Sorbents for Advanced Exploration Systems. In 46th International Conference on Environmental Systems; Vienna, Austria, 2016.

\* cited by examiner

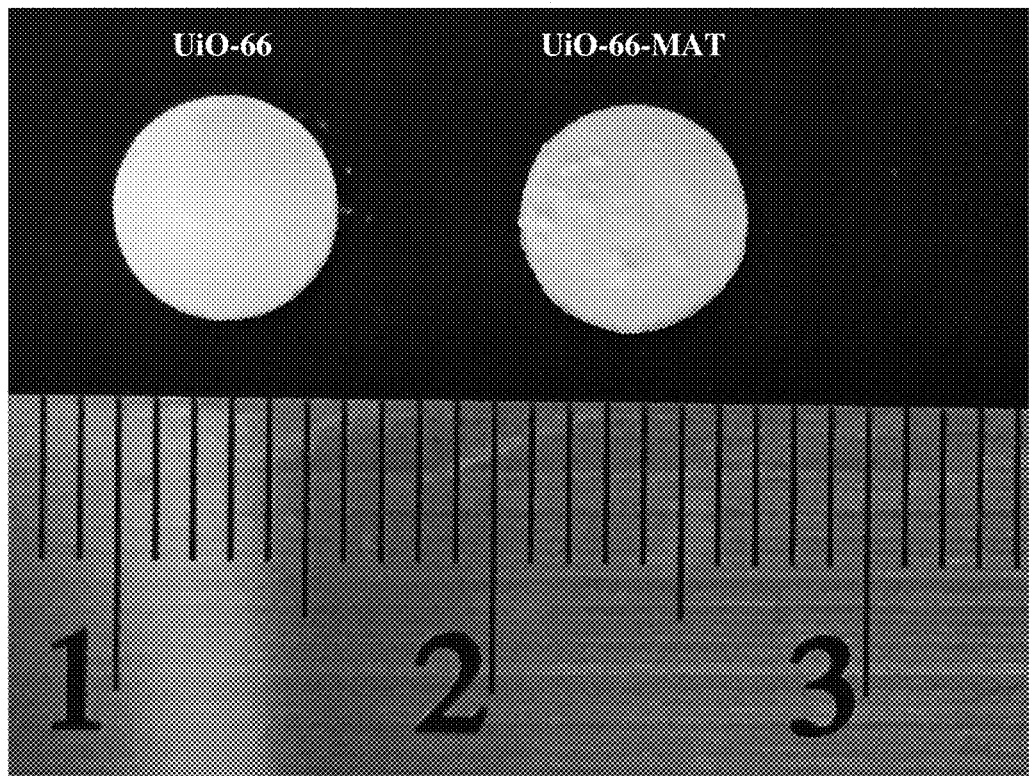
Figure 1: UiO-66 pellet as pressed without binder (left) and UiO-66 pellet coated in Matrimid polymer to increase pellet mechanical integrity. Scale-bar shown is in centimeters.

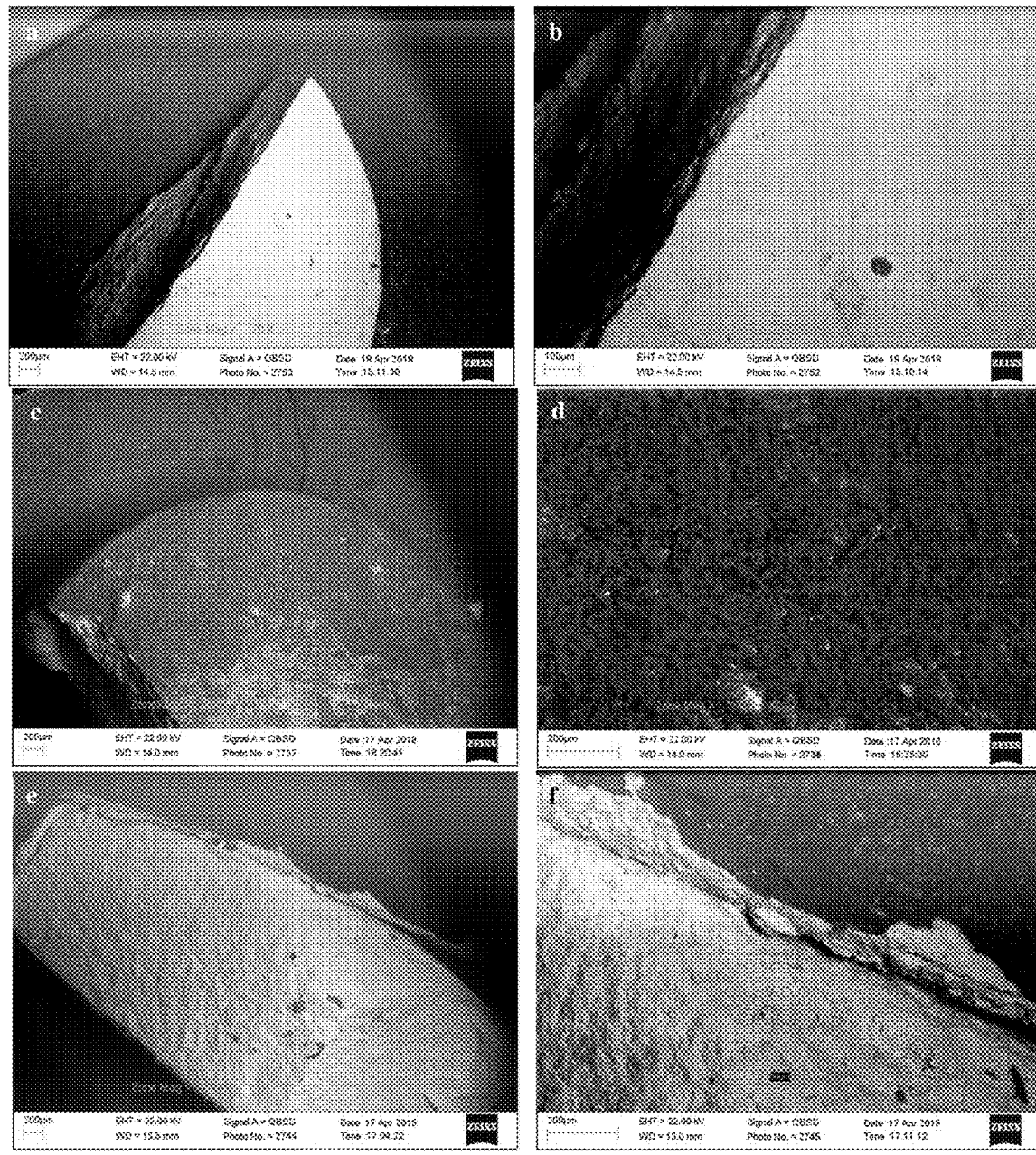
Figure 2: SEM micrographs showing the surface of the uncoated pellet (a,b), the coated UiO-66 pellets (c,d), and a cross-section of the coated pellet showing the coating layers (e,f).

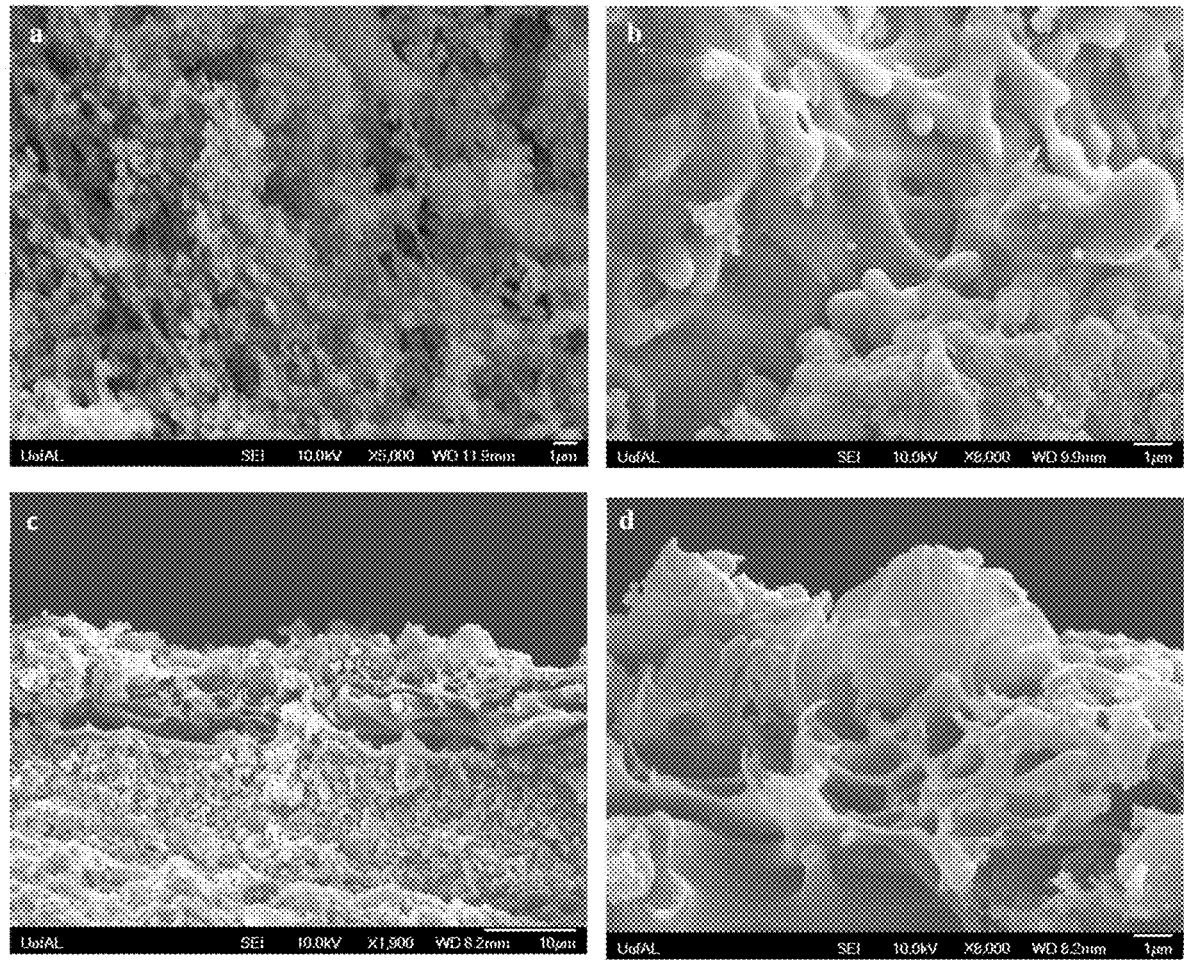
Figure 3: FESEM micrographs of the Matrimid membrane not on an adsorbent surface (a), the porous polymer layer on the surface of UiO-66-MAT pellet (b), the cross-section showing interface between the UiO-66 core and the Matrimid polymer shell (c) and the porous Matrimid layer at higher magnification revealing significant porosity of the coating (d).

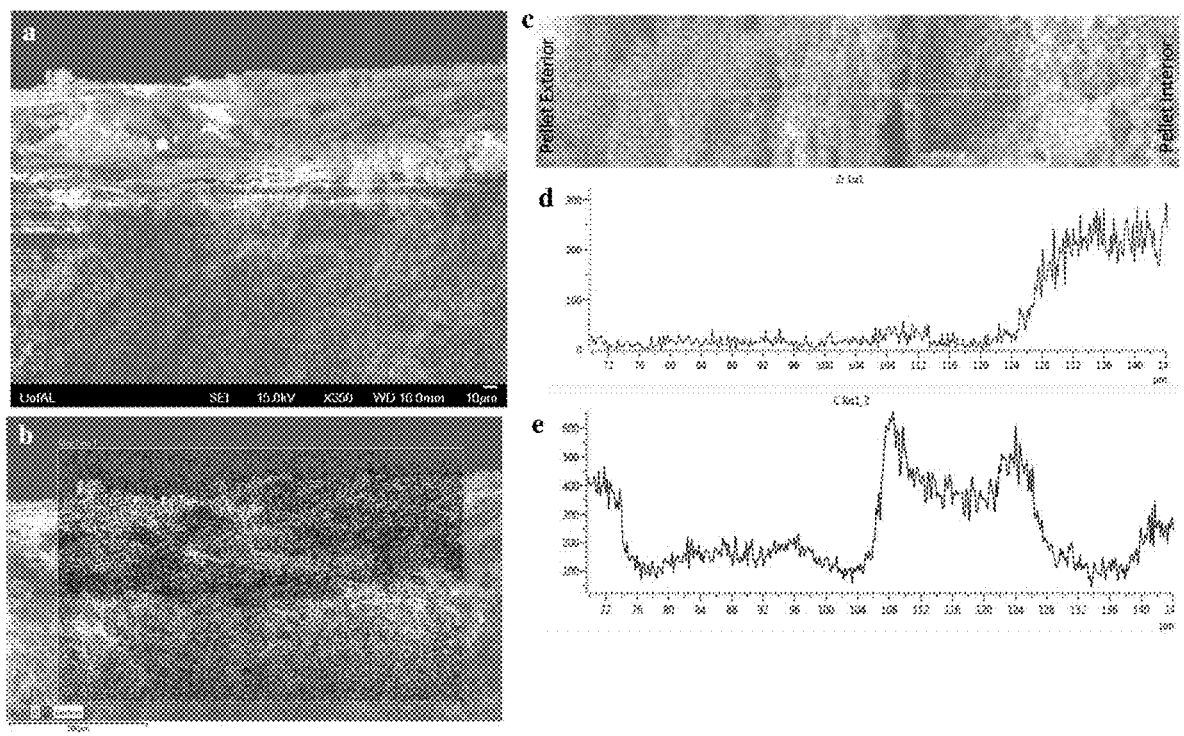

Figure 4: Energy Dispersive X-Rayspectroscopy (EDS) from FESEM shows the chemical mapping of the cross-section of UiO-66-MAT pellet providing the chemical composition of two layers and revealing thickness of the coating. A cross section of the pellet where to layers can be observed via differences in texture (a), EDS mapping of a cross section of the pellet showing carbon in red and zirconium/nitrogen in green, oxygen in yellow (b), a cross section of the pellet (c), EDS scanning along the yellow line shown in (c) for zirconium (d) and carbon (e).

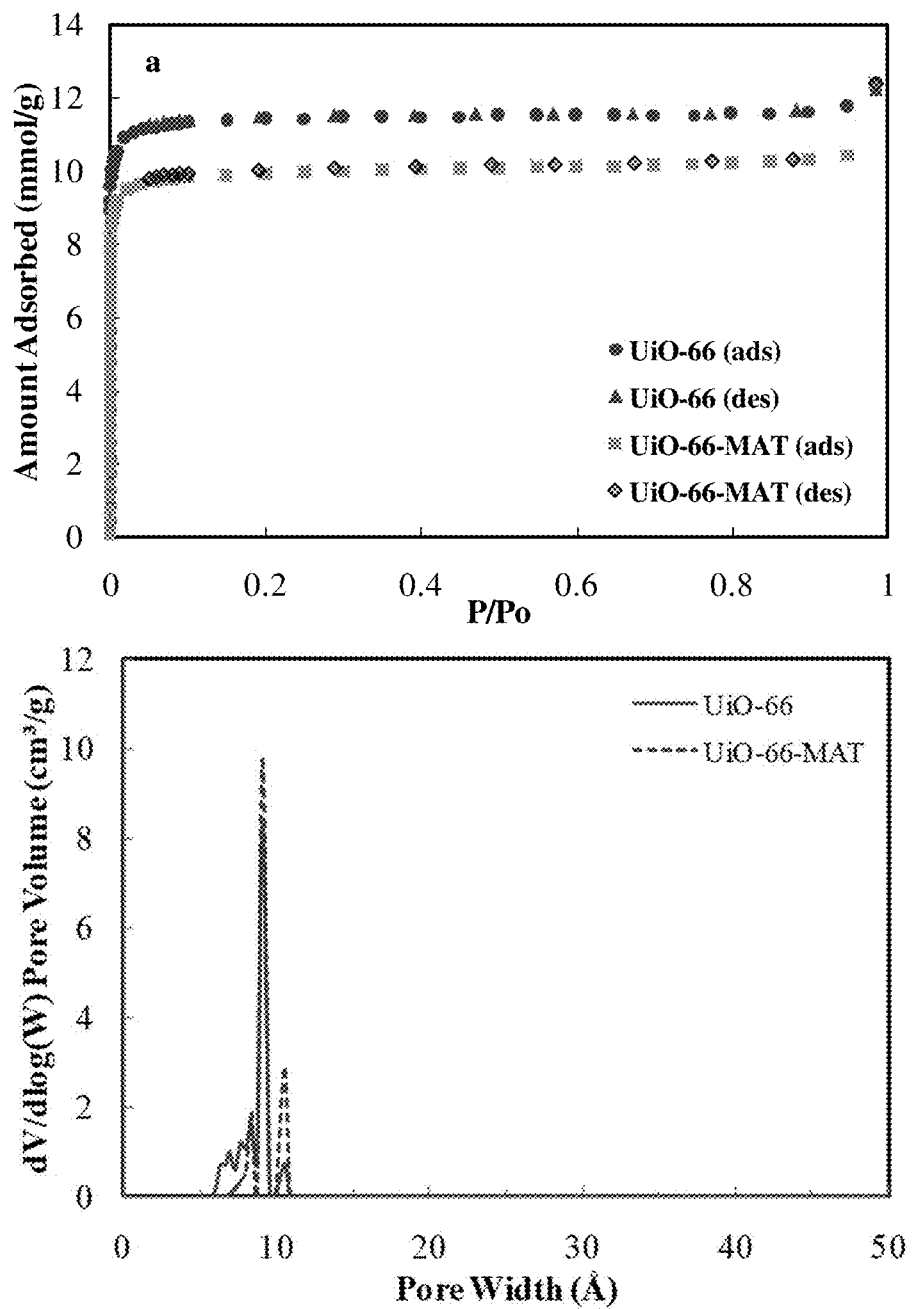
Figure 5: $N_2$ Isotherms (a) and pore size distribution of UiO-66 and UiO-66-MAT (b) to observe the effect of coating on the adsorption properties.

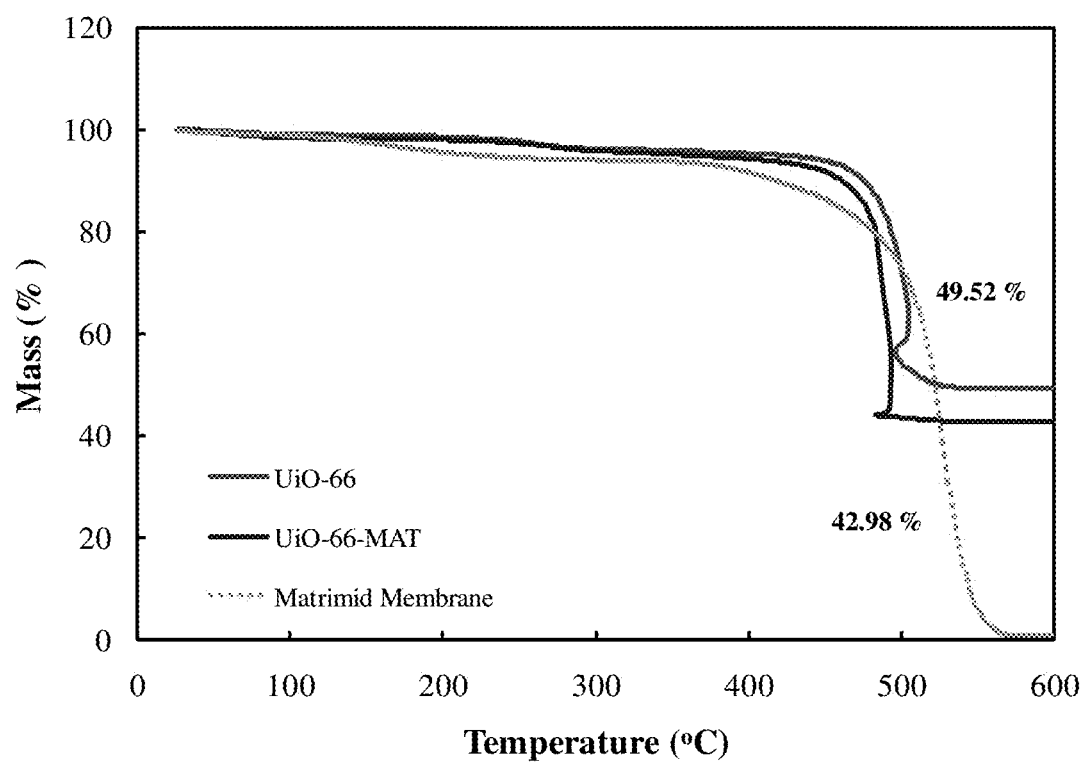
Figure 6: TGA curves demonstrating the thermal stability of the samples and the Matrimid membrane.

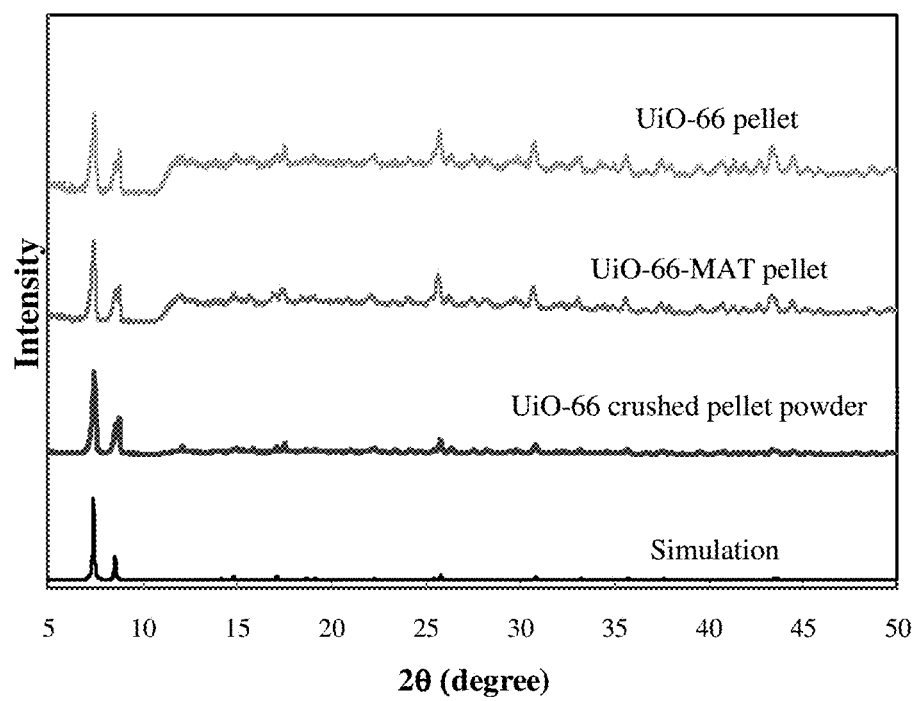
Figure 7: PXRD patterns of the UiO-66 and UiO-66-MAT pellets compared with the crushed UiO-66 pellet and simulated pattern. For pellets 10X magnification of obtained patterns were used for comparison to the simulation.

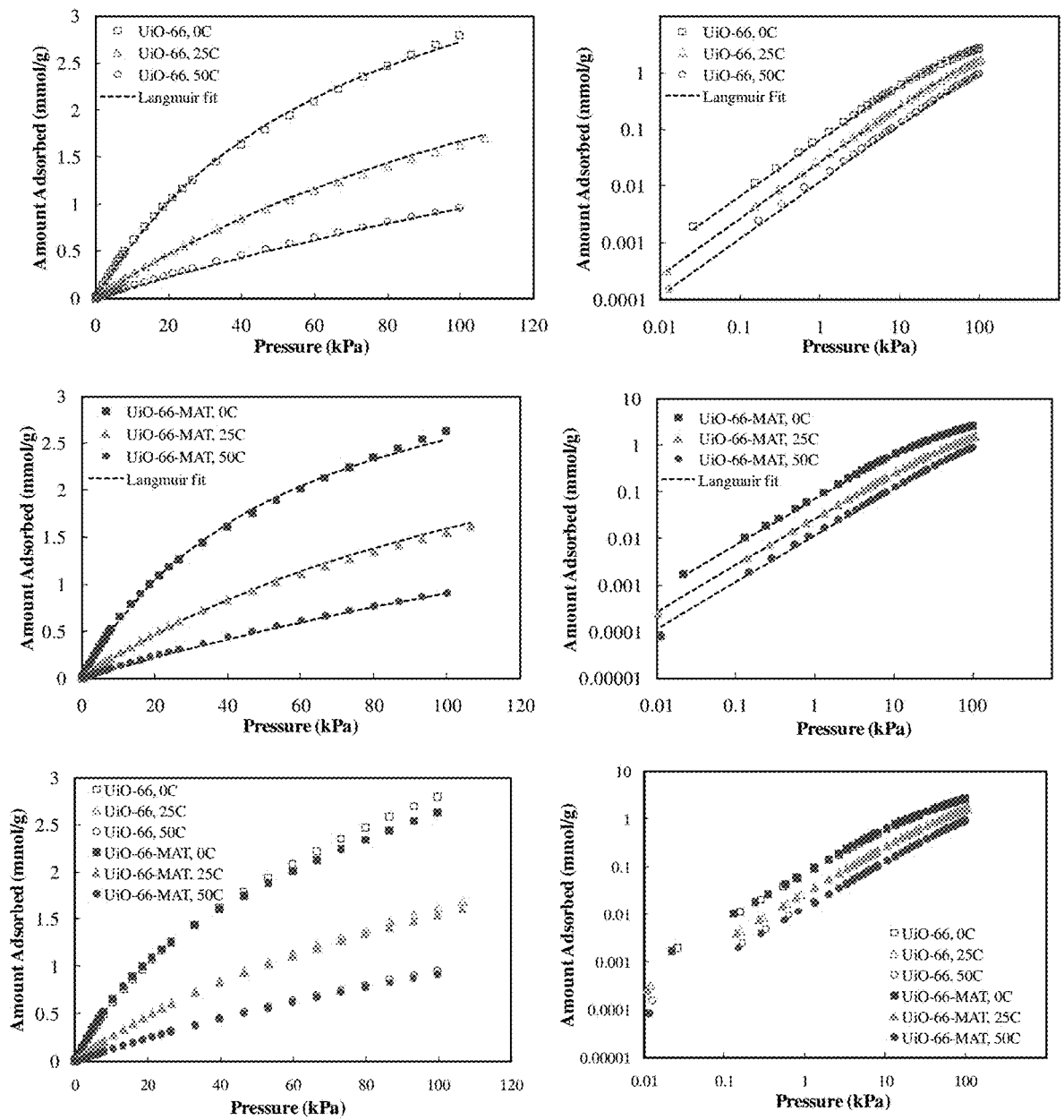
Figure 8: $CO_2$ adsorption isotherms and corresponding Langmuir fits for UiO-66 (a,b) and for UiO-66-MAT (c,d) at 0 °C, 25 °C and 50 °C. Comparison of $CO_2$ isotherms of UiO-66 and UiO-66-MAT at afore mentioned temperatures to show the effect of coating on $CO_2$ uptake (e,f).

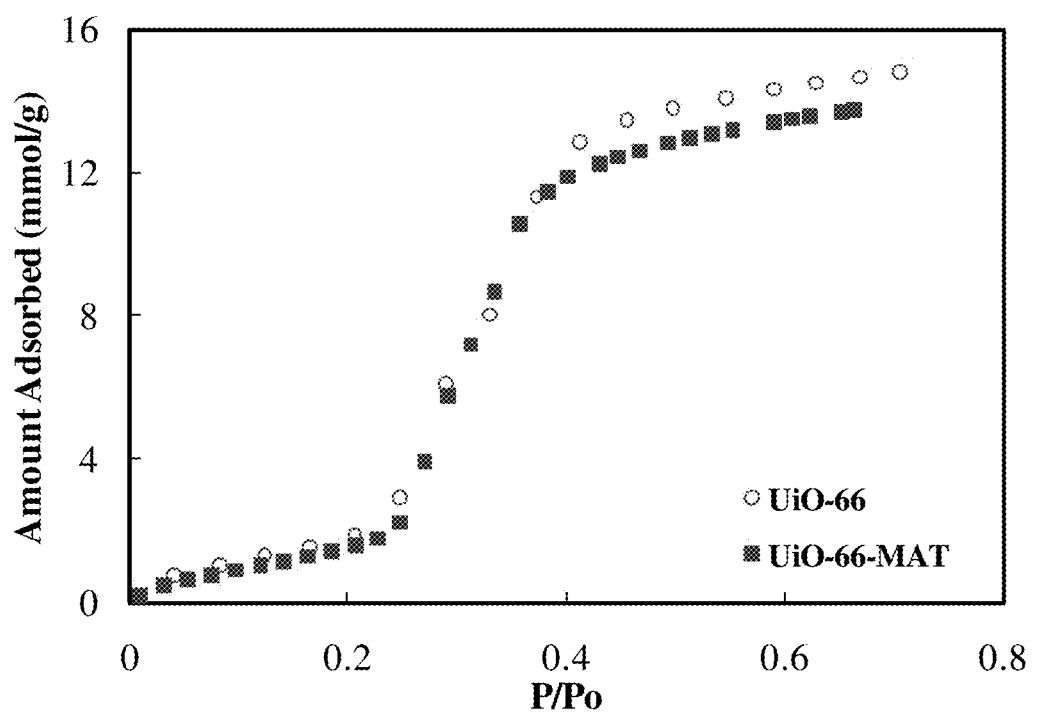
Figure 9: Adsorption Isotherms of $H_2O$ on UiO-66 and UiO-66-MAT at 25°C.

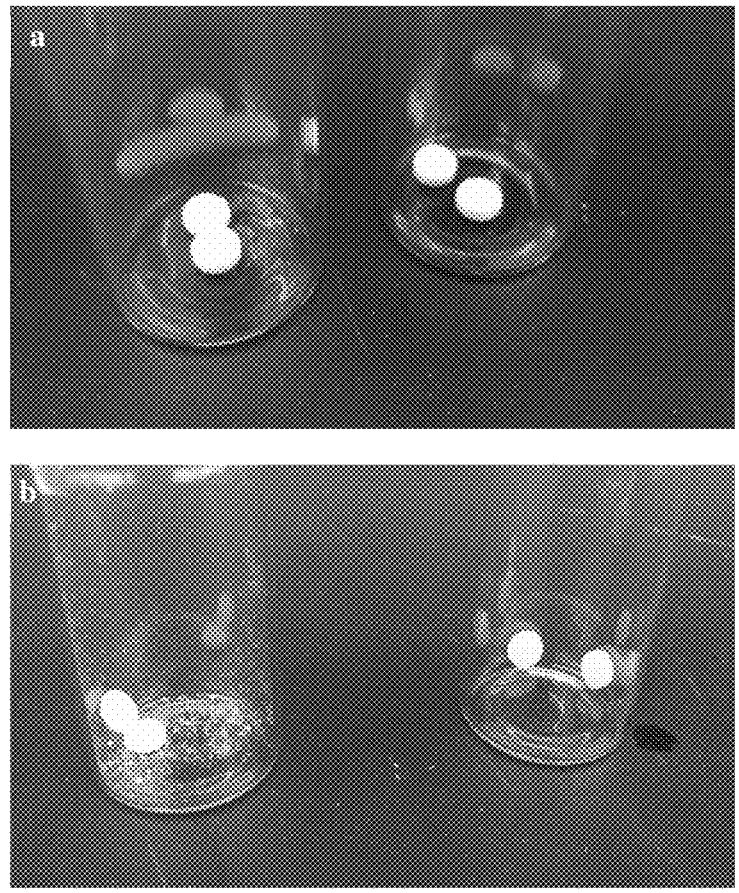
Figure 10: Comparison of mechanical stability of samples evaluated in terms of dust formation after manually shaking at same extent. Condition of 20 ml vials containing 2 pellets of each sample before (a) and after (b) the shaking.

POROUS MEMBRANE ENCAPSULATED PELLET AND METHOD FOR ITS PREPARATION

PRIORITY APPLICATION INFORMATION

The present application claims priority to U.S. Provisional Application Ser. No. 62/974,677 having a filing date of Dec. 16, 2019 and entitled "MEMBRANE ENCAPSULATED ADSORBENT", the entire content and description of which are incorporated herein by reference.

STATEMENT OF RIGHTS

This invention was made with United States Government support under Grant No. NNX16AT47A awarded by NASA Cooperative Agreement Notice NNH16ZHA001C Experimental Program to Stimulate Competitive Research and pursuant to Grant No. NNX16AT47A awarded by NASA Cooperative Agreement Notice NNH16ZHA001C Experimental Program to Stimulate Competitive Research. The Government has certain rights in this invention.

FIELD OF THE INVENTION

The present invention relates to a method of enhancing the mechanical stability of an engineered form (pellet) used for example in the separation of gases or gas-phase reaction systems. More specifically, the present invention may involve the encapsulation of an adsorbent pellet within a membrane to prevent the formation of dust during storage and use in industrial systems.

BACKGROUND OF THE INVENTION

Metal Organic Frameworks (MOFs) have been considered for many different gas adsorption applications including $CO_2$ separations. The research on $CO_2$ capture and removal is generally concentrated in two areas: (i) the capture and storage of anthropogenic $CO_2$ from flue gas which typically contains 10-20% $CO_2$; and (ii) the removal of $CO_2$ from closed environments such as submarines, spacecraft, and space stations, where the $CO_2$ concentration in the environment is typically no more than 1.0% $CO_2$. Anthropogenic production and emission of carbon dioxide may for example be associated with combustion, energy generation, and manufacturing through the use of fossil fuels. Over the past few decades, various technologies such as amine scrubbing (absorption), membrane separation and adsorption have been examined for post-combustion $CO_2$ capture. Of these, amine scrubbing is a mature technology, but suffers from a series of drawbacks including amine loss and degradation, equipment corrosion, formation of potentially carcinogenic nitrosamines and high energy penalties. Pressure swing adsorption (PSA) or temperature swing adsorption (TSA) have promise to avoid some of these technical issues and may provide an energy efficient solution for $CO_2$ separation technology. However, a key step in the development of adsorbent technology for anthropogenic $CO_2$ adsorption is the construction of adsorbent materials with high $CO_2$ uptake; favorable selectivity; good hydrothermal and mechanical stability; and low regeneration energy requirements.

These design criteria are also observed as desirable for adsorbents used to remove $CO_2$ from closed environments, but in general the amount of literature associated with $CO_2$ removal from closed environment is smaller compared to the amount of literature addressing higher concentration $CO_2$ removal from flue gas. While the adsorption of $CO_2$ is common to both applications, the water content, $CO_2$ concentration, and temperature of the gas streams are significantly different and therefore present different technical challenges in each area. For example, in closed-environment applications such as spacecraft, the removal of low concentration $CO_2$ can be technically challenging due to the low driving force for adsorption under dilute adsorbate conditions, competitive adsorption with water and other trace contaminants, as well as size and weight constraints associated with space flight.

Unifying these two topics is a need to develop adsorbent materials that are mechanically stable when applied in industrial adsorption processes.

Of the adsorbent materials that have been studied for $CO_2$ adsorption, considerable effort has been placed on the synthesis of MOFs because MOFs are porous structures and have tunable chemical functionalities so as to be customizable for specific applications. While the tunability of MOFs is commercially appealing, the materials are typically prepared as a powder, which can be difficult to implement in industrial-scale packed-bed applications due in part to high pressure drops and poor heat and mass transport properties that can occur in a column of packed powders.

Thus, there is an ongoing effort to formulate these materials into engineered forms suitable for commercial applications, such as pellets, beads, monoliths, or thin film membranes by mechanical pressing, granulation, extrusion, templating, casting, membrane and the like.

Of these efforts, compression of MOF powders to form pellets is common with the pellets formed with or without a binder material. If pressed with binders, the structure usually has improved mechanical strength and thermal conductivity but also may exhibit reduced adsorption capacity resulting from the poor adsorption properties of the binders, and in some cases the binder blocking the pores of the adsorbent material. For example, the effect of PVA binders and pressurization has been investigated by preparing UiO-66 pellets with and without PVA binder. In the binder-free method, UiO-66 powder was mechanically pressed in the pressure range of 25-340 atm, and they observed that the binder-free pellets pressed at a pressure higher than 100 atm showed a partial collapse in the crystal structure. The BET surface area of the pellet with a PVA binder decreased by 45% compared to the powder whereas the samples pressed at 25 and 50 atm with no binder showed a reduction of approximately 35% and 42% in surface area, respectively. Similar results have been observed while investigating the effect of pelletization pressure on the physical and chemical properties on UiO-66 powder.

In some applications, even with traditional materials such as zeolites, the use of the pellets in an adsorption swing process produces fine dust in the adsorption system. The need for improved adsorbent dusting performance is referenced for example in U.S. Published Patent Application No. 2007/0122609 and U.S. Pat. No. 7,179,382, both to Hiltzik et al. The '609 application describes an adsorbent material, and method for making same, wherein the adsorbent material includes a polymer coating with openings or open areas such as such as microfissures, crevices, cracks, holes, or craters. Similarly, the '382 patent describes reduced dusting of activated carbon (without a reduction in adsorption velocity) by the application of such a polymer coating on granular or shaped activated carbon. The method used for forming the membrane as described in the Hiltzik et al patent and published application includes spraying an emulsion of the polymer onto exposed surfaces of the activated carbon material while it is in a state of turbulence at a processing temperature above ambient temperature; and (b) drying the coated activated carbon material. As described, the drying step causes surface openings in the polymer membrane of at least about 2 μm² open area at the external surface per mm² of encapsulated surface.

Such a method and the resulting product both have a number of drawbacks. First, the method requires the formation of a polymer membrane emulsion, which can be difficult to form on a commercial scale and even more difficult to maintain as stable over time and in the face of for example varying membrane application systems, mechanisms, conditions, temperatures, pressures and the like. Further, the method purposefully creates what are essentially membrane defects that may evolve and expand over time and product use and could impact the longer-term performance and stability of the membrane. In addition, the method focuses on activated carbon, which is typically a mechanically and hydrothermally stable material, and does not provide insight into how a membrane would impact the porosity or adsorption performance of a crystalline material, such as a MOF. Additionally, this work produces a polymer coating from an emulsion but does not discuss the formation of a membrane using a phase inversion technique commonly applied in membrane production.

The interface between a porous solid and a polymer has been explored in the mixed-matrix membranes (MMMs) technical field. In short, a wide variety of polymers for MMMs have been examined including polysulfone, polyvinyl acetate, polyetherimide, polyimide and polybenzimidazole. Though different types of MOF-polymer combinations for MMMs have been discussed, application of these types of polymers to encapsulate a MOF pellet with a membrane has not to Applicant's knowledge been explored.

There is a need for a need to develop adsorbent materials that are mechanically stable when applied in industrial adsorption processes.

In particular, there is a need to focus specifically on the synthesis of pelletized adsorbent materials for the capture and storage of anthropogenic $CO_2$ from flue gas and the removal of $CO_2$ from closed environments.

There is also a need to develop a method of formulating pelletized adsorbent material such that the structure has improved mechanical strength and thermal conductivity without the side effect of reduced adsorption capacity.

There is also a need for a membrane process capable of producing a pelletized adsorbent material containing a continuous film of porous polymer on the pellet without negatively impacting the porosity or adsorption performance of the crystalline material.

SUMMARY OF THE INVENTION

In a first aspect, the present invention is directed to a method of encapsulating an engineered pellet in a porous membrane. The method of the present invention includes the steps of: (i) dissolving a membrane solute in a membrane solvent to produce a membrane solution; (ii) applying the membrane solution to a pellet to form a pellet encapsulated with the membrane solution; (iii) subjecting the membrane solution that encapsulates the pellet to a phase inversion; and (iv) drying the pellet to form a porous membrane encapsulated pellet.

In a second aspect, the present invention is directed to a porous membrane encapsulated engineered pellet, useful for example in a packed-bed adsorption process/system or a packed-bed reaction process/system. The porous membrane encapsulated pellet of the present invention includes an engineered pellet and a porous encapsulation membrane substantially encapsulating the engineered pellet. In one or more embodiments, the porous membrane encapsulated engineered pellet is formed by the method of the present invention.

In a third aspect, the present invention is directed to a method for performing a chemical process on a process stream, wherein the method includes contacting the process stream with the porous membrane encapsulated engineered pellet of the present invention.

In one or more embodiments of the method, steps (ii) through (iv) are repeated in sequence at least once.

In one or more embodiments of the method, the engineered pellet comprises a crystalline material.

In one or more embodiments of the method, the engineered pellet comprises an amorphous material.

In one or more embodiments of the method, the crystalline material comprises a metal organic framework compound.

In one or more embodiments of the method, the crystalline material comprises a zeolite compound.

In one or more embodiments of the method, the pellet contains a binding agent.

In one or more embodiments of the method, the binding agent comprises a clay or polymer.

In one or more embodiments of the method, the solute is a polymer selected from group consisting of polysulfone, poly(vinyl acetate), poly(ether imide), poly(imide), polybenzimidazole.

In one or more embodiments of the method, the polymer comprises poly(imide).

In one or more embodiments of the method, the solute is a monomer or oligomer.

In In one or more embodiments of the method, the membrane solvent comprises N,N-dimethyl formamide.

In another embodiment of the composition, the polymer is dissolved in a solvent to produce a membrane solution.

Further aspects and embodiments of the invention are as disclosed and claimed herein. It should be understood that the description and specific examples are intended for purposes of illustration only and are not intended to limit the spirit and scope of the present invention.

BRIEF DESCRIPTION OF THE DRAWINGS

The invention will be described in further detail below, and with reference to the accompanying drawings, wherein FIG. 1 is a photographic image of a UiO-66 pellet as pressed without binder (left) and UiO-66 pellet encapsulated in Matrimid polymer to increase pellet mechanical integrity. Scale-bar shown is in centimeters;

FIG. 2 is a set of SEM micrographs showing the surface of the unencapsulated pellet (a,b), the encapsulated UiO-66 pellets (c,d), and a cross-section of the encapsulated pellet showing the membrane layers (e,f);

FIG. 3 is a set of FESEM micrographs of the Matrimid membrane not on an adsorbent surface (a), the porous polymer layer on the surface of UiO-66-MAT pellet (b), the cross-section showing interface between the UiO-66 core and the Matrimid polymer shell (c) and the porous Matrimid layer at higher magnification revealing significant porosity of the membrane (d);

FIG. 4 is Energy Dispersive X-Ray spectroscopy (EDS) from FESEM shows the chemical mapping of the cross-section of UiO-66-MAT pellet providing the chemical composition of two layers and revealing thickness of the membrane. A cross section of the pellet where to layers can be observed via differences in texture (a), EDS mapping of a cross section of the pellet showing carbon in red and zirconium/nitrogen in green, oxygen in yellow (b), a cross section of the pellet (c), EDS scanning along the yellow line shown in (c) for zirconium (d) and carbon (e);

FIG. 5 are graphical depictions of $N_2$ Isotherms (a) and pore size distribution of UiO-66 and UiO-66-MAT (b) to observe the effect of membrane on the adsorption properties;

FIG. 6 are TGA graphical curves demonstrating the thermal stability of the samples and the Matrimid membrane;

FIG. 7 are PXRD patterns of the UiO-66 and UiO-66-MAT pellets compared with the crushed UiO-66 pellet and simulated pattern. For pellets 10× magnification of obtained patterns were used for comparison to the simulation;

FIG. 8 are $CO_2$ graphical depictions of adsorption isotherms and corresponding Langmuir fits for UiO-66 (a,b) and for UiO-66-MAT (c,d) at 0° C., 25° C. and 50° C. Comparison of $CO_2$ isotherms of UiO-66 and UiO-66-MAT at afore mentioned temperatures to show the effect of membrane on $CO_2$ uptake (e,f);

FIG. 9 are graphical depictions of adsorption isotherms of $H_2O$ on UiO-66 and UiO-66-MAT at 25° C.; and FIG. 10 is a set of images providing a comparison of mechanical stability of samples evaluated in terms of dust formation after manually shaking at same extent. Condition of 20 ml vials containing 2 pellets of each sample before (a) and after (b) the shaking.

DETAILED DESCRIPTION

In a first aspect, the present invention is directed to a method of encapsulating an engineered pellet in a porous membrane. The method of the present invention includes the steps of: (i) dissolving a membrane solute in a membrane solvent to produce a membrane solution; (ii) applying the membrane solution to a pellet to form a pellet encapsulated with said membrane solution; (iii) subjecting the membrane solution that encapsulates the pellet to a phase inversion and (iv) drying the pellet to form a porous membrane encapsulated pellet. In one or embodiments, the pellet or engineered pellet may be a crystalline material. In one or more embodiments, the pellet or engineered pellet may be an amorphous material. The phrases "pellet" or "engineered pellet" are intended to generally include shaped or molded materials, often formed by pressing, extruding, milling or the like a powder or particulate material with or without binder, which is useful in this form as a component of a chemical process such as separation and chemical reaction and is intended to include geometrically symmetric materials formed generally as pellets as well as spheres, capsules, rods, moldings, monoliths and other similar physical forms as well as geometrically asymmetric materials that may be formed by e.g. crushing or pulverizing. Examples include but are not limited to pellets useful in separation or adsorption processes, termed adsorption pellets, and pellets useful in chemical reaction or chemical catalysis, termed catalysis pellets. Examples of adsorption pellets are described in U.S. Pat. No. 6,093,236 and U.S. Published Patent Application No. 2018/0147527 while examples of catalysis pellets are described in U.S. Pat. No. 4,063,900, the contents and disclosure of each of which are hereby incorporated herein by reference.

Materials suitable for use as pellets or engineered pellets of the present invention include, but are not limited to crystalline aluminosilicates (zeolites), metal organic framework compounds, carbons, carbon nanotubes, carbide derived carbons, silicas, silica gels, aerogels, mesoporous silicas, activated carbons, polymers of intrinsic microporosity, zeolitic imidazolate frameworks, aluminosilicas, metal oxides, metal hydroxides, zirconium hydroxide, zirconium oxides, clays, or composites of these materials.

In a preferred embodiment, the engineered pellet is a metal organic framework (MOF) material or a zeolite material. The material may exist as an engineered pellet formed via pressing of powder or through the use of a binding agent, which may include, but is not limited to, clays and reactive solids that can be used to entrain or hold a powder in an engineered form such as a pellet, sphere, or extrudate. As used herein, a MOF comprises a class of compounds consisting of metal ions or clusters coordinated to organic ligands to form one-, two-, or three-dimensional structures. They are a subclass of coordination polymers, with the special feature that they are often porous. MOFs are commercially available for example under the product name UiO-66 and are described for example in U.S. Pat. Nos. 7,910,732 and 9,078,922, the contents and disclosure of which are expressly incorporated herein by reference.

In one or more embodiments, the porous membrane encapsulated pellet is generally useful in a separations process in a packed-bed, moving-bed, or simulated moving-bed. In such embodiments, gas species are introduced to the bed and a separation is performed via adsorption on the adsorbent. The separation may include several steps including pressurization, equilibration, blow-down, re-pressurization and in some cases these steps may include heat. The packed-bed separation may include a step that removes that separated components from the adsorbent via heat only. In the preferred embodiment, these steps, which may be used in combination or with a combination of different beds simultaneously, may constitute a pressure swing or temperature swing adsorption process.

MOFs suitable for use in the present invention include, but are not limited to, any of the Metal-Organic Framework structures listed in publicly available materials such as those available from Cambridge Crystallographic Data Centre, the Metal-Organic Framework Database hosted by Northwestern University, or the Computation-Ready Experimental Metal-Organic Framework (CoRE MOF) 2019 Dataset. Zeolites suitable for use in the present invention include, but are not limited to, zeolites listed in publicly available materials such as the Database of Zeolite Structures, as maintained by the International Zeolite Association.

A step of the method of the present invention may include dissolving a membrane solute in a membrane solvent to produce a membrane solution. In one or more embodiments, the membrane solute may be a polymer such as a thermoplastic polymer. Suitable polymers for the solute include, but are not limited to, polysulfone, poly(vinyl acetate), poly (ether imide), poly(imide), polybenzimidazole and poly(imide). In one or more embodiments, the solute may be an oligomer or a monomer and, in such embodiments, the method of the present invention may include polymerizing the monomer or further polymerizing the oligomer.

Preferably the solute is a polymer, more preferably a thermoplastic polymer and even more preferably a poly (imide) obtained by the polycondensation of 3,3',4,4'-benzophenone tetracarboxylic dianhydride (BTDA) and a mixture of two rigid cycloaliphatic indane-type monomers, 5- and 6-amino-1-(4'-aminophenyl)-1,3,3-trimethylindane. Such poly(imides) are commercially available for example from Huntsman under the trade name Matrimid™ 5218.

Membrane solvents suitable for membrane solution in the present invention include, but are not limited to, methylene chloride, ethylene chloride, chloroform, tetrachloroethane, tetrahydrofurane (THF), dioxane, acetophenone, cyclohexanone, m-cresol, g-butyrolactone, dimethylformamide (DMF), dimethylacetamide (DMAC), and N-methylpyrrolidone (NMP) preferably N,N-dimethyl formamide (DMF). In one or embodiments, the membrane solvent is capable of dissolving the solute and is also soluble or substantially soluble in the antisolvent as described in more detail below.

The method of the present invention may include a step of applying the membrane solution to the pellet to form a precursor pellet, which can be alternatively described as pellet encapsulated with the membrane solution. The membrane solution may be applied in a substantially uniform or uniform manner and the encapsulation may be substantially uniform or uniform. The membrane solution may be applied in a substantially continuous or continuous manner and the encapsulation may be substantially continuous or continuous. The applying step may be performed using devices and techniques well known to one or ordinary skill in the art of solution membrane, including for example spraying, dipping, moving the pellet through a membrane solution bath, stream, cascade the like.

The method of the present invention may include a step of subjecting said membrane solution that encapsulates the pellet to a phase inversion. In this step, the membrane solution that encapsulates the pellet is contacted with an antisolvent which causes the membrane solvent to migrate from the membrane solution and into the antisolvent, in which the membrane solvent is substantially soluble or soluble. Accordingly, this step may also be described as a step of contacting the membrane solution that encapsulates the pellet with an antisolvent, more particularly contacting the membrane solution that encapsulates the pellet with an antisolvent causing the membrane solvent to migrate from the membrane solution and into the antisolvent. The migration of the membrane solvent into the antisolvent from the membrane solution may form pores in the membrane solution of the precursor pellet. Such contacting and solvent migration is generally known in the art for forming porous membranes useful in separation processes and the like, as exemplified by U.S. Published Patent Application No. 2017/0263908 and U.S. Pat. No. 9,278,319, the contents and disclosure of which are hereby incorporated herein by reference.

As a general matter, suitable antisolvents are materials in which the membrane solvent is soluble; therefore their selection depends in part on the choice of membrane solvent. Non-limiting examples may include water, alcohols, acetic acid, acetone, acetonitrile, benzene, n-butanol, butyl acetate, carbon tetrachloride, chloroform, 1,2-dichloroethane, dichloromethane, cyclohexane, heptane, pentane, 2,2,4-trimethylpentane, in particular for embodiments wherein the membrane solvent is for example N,N-dimethyl formamide (DMF). Combinations of solvents, or mixed solvents, may also be used to enhance phase inversion.

In one or more embodiments, the subjecting step or contacting step may include multiple subjecting or contacting substeps in series, each with the same or different antisolvent. In one non-limiting example, the subjecting or contacting step may include a first substep of contacting the membrane solution with water, a second substep of contacting the membrane solution with water and a third substep of contacting the membrane solution with an alcohol.

In one or more embodiments, the contacting or subjecting step or phase inversion step may be conducted with the antisolvent in the liquid phase and contacting, containing or immersing the aforementioned pellet encapsulated with membrane solution. In one or more embodiments, the contacting or phase inversion step may be conducted with the antisolvent in the gas phase and contacting the pellet encapsulated with membrane solution with an antisolvent vapor. Accordingly, in one or more embodiments, the subjecting or contacting step may include contacting the membrane solution that encapsulates the pellet with antisolvent in the gas phase. Further, in one or more embodiments, the subjecting or contacting step may include contacting the membrane solution that encapsulates the pellet with antisolvent in the liquid phase. Examples of liquid phase contacting include immersing, spraying and the like.

The contacting step third step may also be completed with and therefore further include agitating the pellets encapsulated with membrane solution during the subjecting step to enhance the phase inversion process. Examples of agitating may include tumbling, flipping, rolling and the like.

The method of the present invention may include a step of drying said pellet to form a membrane encapsulated pellet. While drying may be achieved at ambient conditions such as room temperature, suitable process conditions for drying may include a temperature ranging from 80 to 100 degrees Centigrade, preferable 90 degrees Centigrade, and a drying time ranging from 3-4 hours in for example an oven or a vacuum oven. The drying can be done with or without a flow of inert gas or air or under vacuum. The drying can be done continuously or in a batch process. It will be understood by one of ordinary skill that drying can also be achieved under ambient conditions if processing time is less of a concern.

An optional additional step in the method the present invention includes cooling the membrane encapsulated pellet.

In one or more embodiments, the method of the present invention may include performing steps (ii) through (iv) in sequence at least two times or repeating steps (ii) through (iv) in sequence at least once. In one or more embodiments, the method includes performing steps (ii) through (iv) in sequence two times or repeating steps (i) through (iv) once. One of ordinary skill will appreciate that step (i) may also need to be performed more than one time or repeated should the first iteration of step (i) not produce sufficient membrane solution for these embodiments. Accordingly, in one or more embodiments, the method of the present invention may include performing steps (i) through (iv) in sequence at least two times repeating steps (i) through (iv) in sequence at least once. In one or more embodiments, the method includes performing steps (i) through (iv) in sequence two times or repeating steps (i) through (iv) in sequence once.

In another aspect, the present invention is directed to a porous membrane encapsulated pellet. The porous membrane-encapsulated pellet of the present invention includes a pellet or an engineered pellet and a porous membrane encapsulating the pellet. In one or more embodiments, the porous membrane includes a plurality of pores formed therein. In one or more embodiments, the pores have an average morphology or average porosity size in the nanoscale range. In one or more embodiments, the pores have an average cross-sectional area of less than 2 $\mu m^2$ or less than 1.5 $\mu m^2$ or less than 1.0 $\mu m^2$. In one or more embodiments, the porous membrane has an average thickness of between 25 $\mu m$ and 60 $\mu m$. In one or more embodiments, the porous membrane thickness is substantially uniform or is uniform on a microscale level. In one or more embodiments, the porous membrane is substantially continuous or is continuous on a microscale level. "Microscale"

as used herein is generally intended to describe characteristics at a micron level (as opposed to a substantially smaller level such as for example a nanometer scale or nanoscale level).

In one or more embodiments, the porous membrane-encapsulated engineered pellet of the present invention is formed by a method including i) dissolving a membrane solute in a membrane solvent to produce a membrane solution; (ii) applying said membrane solution to said pellet to form a pellet encapsulated with said membrane solution; (iii) subjecting said membrane solution to a phase inversion; and (iv) drying said pellet to form a membrane encapsulated pellet.

In another aspect, the present invention is directed generally to a chemical process, for example a chemical separation process for a chemical reaction process. In this aspect, the method of the present invention includes contacting a process stream with the porous membrane encapsulated pellet of the present invention. In one or more embodiments, this aspect is a method for performing a chemical process, such as for example, adsorption, reaction or catalysis, on a process stream that includes contacting the process stream with a membrane encapsulated engineered pellet formed by a method including i) dissolving a membrane solute in a membrane solvent to produce a membrane solution; (ii) applying the membrane solution to a pellet to form a pellet encapsulated with said membrane solution; (iii) subjecting said membrane solution to a phase inversion; and (iv) drying said pellet to form a porous membrane encapsulated pellet.

All of the relevant teachings hereinabove also apply to this composition, for example, teachings relating to packed-bed adsorption process, membrane surface-adsorbent material, phase inversion, crystalline materials, etc. Accordingly, it will be appreciated that all information and description set forth herein in regard to features and elements of one aspect or embodiment of the present invention are expressly applicable to and intended to fully support other aspects and embodiments described herein.

The following examples, while provided to illustrate with specificity and detail the many aspects and advantages of the present invention, are not to be interpreted as in any way limiting its scope. Variations, modifications and adaptations which do depart of the spirit of the present invention will be readily appreciated by one of ordinary skill in the art.

Example 1

Introduction

The purpose of this work described in this Example is to produce using the method of the present invention a mechanical, robust porous membrane encapsulated adsorbent pellet of the present invention and to determine the impact of the encapsulating membrane on the $CO_2$ adsorption properties of the pellet.

Of the polymers that are suitable for MMMs and as the membrane solute, a polyimide commercially available under the trade name Matrimid™ is particularly appealing for this pellet application because the glass transition temperature is approximately 320° C., which allows the encapsulated MOF to be regenerated at the same temperature that would be used to regenerate the pure MOF powder. Much like the variety of polymers that can be used to produce a porous membrane encapsulation for a pellet, there are many MOFs suitable for pellets that may be encapsulated by this method, and of these, UiO-66 is of interest as a broadly representative MOF because UiO-66 is water stable and can be produced at a kg scale. Additionally, this material can be formed into pellets without binder via a press, which is a common first approach when forming MOFs into pellets. The MOF field produces many materials for many different applications, but by utilizing UiO-66 to examine $CO_2$ adsorption this work will illustrate a process to produce a mechanically stable MOF pellets that is likely broadly applicable to many MOFs and many applications beyond $CO_2$ capture.

Materials

Binderless pellets of UiO-66 MOF ($Zr_6O_6(BDC)_6$) were synthesized using known and commercially available methods. The synthesized powder was then pressed into pellets using a single-punch high throughput industrial tablet-press machine. The pressure used to produce each pellet was not provided by the device; however, the process resulted in pellets having an approximate diameter, thickness and weight of 6 mm, 2 mm and 50 mg respectively.

Commercially available polyimide material known as Matrimid 5218 was procured from Huntsman Advanced Materials Americas LLC and was used as the membrane solute in the membrane (the shell). Matrimid 5218 is here after simply referred to as Matrimid. N,N-dimethyl formamide (DMF), was purchased from Thermo Fisher Scientific Chemicals, Inc. and was used as the membrane solvent for the Matrimid.

Membrane

To produce the porous membrane encapsulated pellet, 4 wt % Matrimid was dissolved in DMF in a beaker using a magnetic stirrer at room temperature ($\approx 25°$ C.) for 15-30 minutes. Pelletized UiO-66 (10 g) was placed uniformly on a test sieve (8 mesh) produced by Retsch GmbH. The membrane solution (9 mL) was applied to the pellets uniformly using an airbrush (Master Airbrush Pro Gravity Feed airbrushing system) at 40 psi for 8-10 minutes. Immediately afterwards a phase inversion phase inversion procedure was completed. In this step, Milli-Q (~1000 mL) water was used as the antisolvent and the pellets encapsulated with membrane solution were agitated in the water for 5-10 minutes to enhance the phase inversion process. The resulting encapsulated pellets were visually checked for agglomeration and excess polymer. The wet pellets were then dried at 90° C. for 3-4 hours in an oven. The applying, phase inversion and drying steps were then applied again in sequence to the dried pellets prepared above. The pellets were allowed to cool to room temperature in between each repetition of the method.

A twice-repeated process was used based on preliminary experiments examining membrane formation via spray membrane of the Matrimid membrane solutions on zeolite pellets. Zeolite pellets were used as a first attempt at determining an encapsulation method because zeolite pellets are less expensive than MOF pellets. During these experiments it was determined that a single pass of the applying, phase inversion and drying steps was not as effective as performing these steps twice in sequence. It was noted that, in performing the steps three times in sequence, membrane material flaked off the pellets.

Characterization

Scanning Electron Microscope

The morphology and structure of both pellets and membrane encapsulated UiO-66 and UiO-66-MAT pellets were examined by scanning electron microscopy (SEM model: ZEISS EVO 50) and field emission scanning electron microscopy (FESEM model: JEOL 7000F). On the EVO 50, all samples were mounted on aluminum stubs and none of the samples were sputter-encapsulated with gold. Both the pellet surface and cross section of a cut pellet were observed. The EVO 50 was equipped with a backscatter electron detector and an accelerated voltage of 22 kV was used. Prior to FESEM the samples were sputter-encapsulated with gold for 90 seconds at 10 mA. The instrument used a field emission source with an accelerating voltage of 10 KeV and a secondary electron detector. Images were captured to characterize the porosity in the pellet, the membrane-encapsulated pellet, and a stand-alone Matrimid membrane. The FESEM was equipped with an Energy Dispersive X-Ray Spectroscopy (EDX) detector for chemical mapping. Line scans were collected across the mount-membrane-pellet interface to chemically map the cross-section of UiO-66-MAT sample.

Gas Absorption

Nitrogen physisorption isotherms at −196° C. (77 K) and $CO_2$ isotherms at 0, 25 and 50° C., were collected using a Micromeritics 3Flex. For all gas adsorption measurement, 90-110 mg of adsorbent was transferred to a pre-weighed glass sample tube and that was capped using a Micromeritics supplied sample cell cap (seal frit). A Micromeritics Smart-VacPrep unit was utilized to outgas samples at 150° C. for 15 hrs. The evacuated tube containing the activated sample was then transferred to a balance and weighed to determine the degassed sample mass. Then the tube was placed in the analysis port of the 3Flex surface analyzer and an additional 3 hrs of in-situ degassing at 150° C. was performed. The water adsorption capacity of the samples was measured using a Micromeritics ASAP 2020 sorption apparatus and a similar activation procedure. The surface area of all samples was calculated by Brunauer-Emmett-Teller (BET) method. Pore volume and pore size distribution values were calculated with non-local density functional theory (NLDFT) using slit pore carbon kernel, respectively using the $N_2$ isotherm at 77 K.

X-Ray Diffraction

The X-ray diffraction patterns of the UiO-66 pellets, crushed UiO-66, UiO-66-MAT pellets were measured using a Proto manufacturing AXRD bench-top powder diffractometer. Samples were scanned at 30 kV and 20 mA using CuK-α radiation), a step size of 2Θ=0.02° over the 2θ range of 5-50°. Zero background discs were used to minimize background scattering for the pellets. Because the sample being analyzed was a pellet and cannot lay perfectly flat on the sample holder surface, it was necessary to utilize a sample holder with a recess so that the height of the sample could be adjusted to minimize sample preparation error in the data. Specifically, a piece of clay was placed in the recess (cup) of the sample holder, and a zero-background disk was placed on top of the clay. Then the pellet was placed on a zero-background disk, and the zero-background disk was pressed down into the clay to level the pellet with the edge of the sample holder.

Thermal Gravimetric Analysis

The thermal stability of the membrane was investigated using thermogravimetric analysis (TGA, model TG 209 F1, NETZSCH, Germany) and data was collected on the pellets, encapsulated pellets and the stand-alone pure Matrimid membrane. Prior to analysis, several grams of samples were regenerated using Smart VacPrep unit at 150° C. (temperature ramp rate 5° C./min) for 15 hrs to remove solvents. Then a small sample of the regenerated material was weighed and placed inside an alumina crucible for the TGA experiment. Samples were heated to 600° C. at a heating rate of 3° C. per minute while exposed to continuous flow of UHP air at a flow rate of 40 mL/min. Approximately 15-18 mg of sample was used for all TGA experiments. For both pellets and encapsulated pellets, a plateau in the TGA recorded mass at 300° C. was observed, and another after thermal degradation of the membrane solute polymer at approximately 540° C. The mass of the membrane solute polymer was determined as the difference in mass between these two plateaus.

Adsorbent Dusting

As a simple preliminary assessment of the ability of the encapsulating membrane to increase the mechanical integrity of the pellet, 2 pellets of both UiO-66 and UiO-66-MAT were placed in two separate 20 ml vials and shaken to observe the formation of fines due to the shaking. A more quantitative method was then developed using a PQ-N04 Planetary Ballmill from Across International, USA. Prior to the attrition test, 8 pellets of each sample were placed in two pre-weighed Micromeritics 3 Flex sample tubes with seal frits and were degassed using VacPrep for 15 hrs at 150° C. (ramp rate 5° C./min). After outgassing the sealed glassware was weighed to determine the mass of dry sample. The samples were transferred into two different 50 ml stainless steel test jars in a controlled environment (UHP $N_2$) glovebox. Steel balls were not placed in the test jars with the sample. The test jars were then placed in the grinding stations arranged on the "Sun Wheel" of the planetary ball mill. The test was conducted at a rotational speed of 400 rpm for 10 minutes. After rotation in the ball mill, the samples were removed from the ball mill cups and placed onto a No. 20 ASTM sieve that had a collection pan underneath the sieve. The sieve was then gently shaken, and the fines were collected. The pellets were then collected and degassed at the same conditions as before and subsequently weighed. The difference in weight before and after the ball mill operation was estimated as the amount of dust formation during the ball mill attrition test.

Results and Discussion

Visual and microscopic observations of the samples generally confirmed the presence of the membrane on the surface of the pellets. FIG. 1 shows the difference between the pellet and encapsulated UiO-66 pellet (here after referred as UiO-66-MAT) after the oven drying step. While the pellet was the same white color as the UiO-66 MOF, the encapsulated pellet was yellow consistent with the color of Matrimid polymer. SEM images were collected to survey the surface of the pellet and are shown in FIG. 2. The encapsulated pellet (FIG. 2 *c,d*) shows the membrane and changes in surface texture/roughness when compared to the native pellet (FIG. 2 *a,b*). To examine the thickness of the membrane in relation to geometry of the pellet, the encapsulated pellet was cut in half and the cross section is shown in FIG. 2 *e,f*. The images show that the membrane comprises a small fraction of the mass of the pellet and appear to exist only on the surface of the MOF pellet. Likewise, the core of the encapsulated MOF pellet appears unchanged when compared to the surface of the native pellet indicating that performance of the method likely had little impact on the majority of the adsorbent material contained in the pellet.

FESEM micrographs were collected to gain a better understanding of membrane. FIG. 3*a* shows a highly porous cross-section of Matrimid membrane formed using the method of the present invention, but simply formed on a non-porous surface to produce a control sample. FIG. 3*b,c* show the surface and cross-section of the membrane encapsulated pellet. Pores are present in the surface and throughout the membrane, and there is a distinct interface between the membrane and the pellet. At higher magnification, the porous nature of the membrane encapsulating the UiO-66 can be readily observed (FIG. 3*d*).

FESEM and Energy dispersive X-ray spectroscopy (EDS) data are shown in FIG. 4. FIG. 4*a* shows a cross section of the encapsulated pellet allowing the membrane to be identified on the surface of the pellet via the differences in texture between the surface and the core of the pellet. When examined in more detail, FIG. 4b provides an EDS mapping of the two layers. EDS indicates the membrane (as detected by the presence of carbon) has a thickness of approximately 60 µm.

FIGS. 4d and 4e examine a different site on the pellet and show the EDS data in the form of a line scan. These data show a membrane membrane that is approximately 25 µm thick. This was concluded because the Zr signal from the MOF occurs only after moving through approximately 25 µm of the membrane as indicated by the carbon signals. The carbon signal on the left-hand side of the figure is due to the carbon tape used to mount the sample. From these two sites it is reasonable that the porous membrane average thickness is between 25 and 60 µm.

Adsorption isotherms were measured to understand if and how the membrane has impacted the surface area and pore structure of the MOF pellet. Nitrogen adsorption data in FIG. 5a show Type I isotherms with no hysteresis loops for both UiO-66 and UiO-66-MAT. The shape of the isotherm remains unchanged, which indicates that the nanoporous structure of the MOF was not changed in a significant capacity due to the membrane processes. As shown in Table 1, the native UiO-66 pellets have a surface area of 1051 m$^2$/g and pore volume of 0.39 cm$^3$/g, and the porous membrane encapsulated pellets have a surface area and pore volume of 912 m$^2$/g and 0.38 cm$^3$/g respectively. The results show that the encapsulated pellet retains 88% of the surface area of the unencapsulated material. The retention of the porosity of the pellet is obtained because the membrane is porous and is relatively thin (25 micron).

Likewise, the pore size distributions of both the encapsulated and unencapsulated pellet (FIG. 5b) are similar with only a small increase in the mesopore content in the encapsulated pellet, which can likely be attributed to the presence of a mesoporous structure in the Matrimid membrane. The average pore size as estimated from the pore size distribution plots is 0.91 nm for both UiO-66 and UiO-66-MAT pellets. The consistent pore size distribution between the unencapsulated and encapsulated pellets is important because it indicates that the membrane has not filled the pore openings of the MOF.

Thermal gravimetric analysis (TGA) was completed to provide an estimate of the mass of the membrane, and the data are shown in FIG. 6. The TGA experiments were conducted using dry air, and the initial small mass loss up to 300° C. was attributed to water evaporation and any residual polymer solvent. After approximately 540° C., no significant mass loss was observed for either encapsulated or unencapsulated sample. The encapsulated sample lost 6.5% more mass compared to the unencapsulated sample from 300° C. to 600° C., which was attributed to the loss of membrane polymer and possible loss of adsorbed solvent. The results are consistent with the degradation of pure Matrimid membrane occurring near 390° C. and the degradation of the unencapsulated UiO-66 pellets occurring near 470° C. The use of TGA to determine the membrane polymer mass is likely more accurate than the use of surface area change to determine membrane mass because the change in surface area may be impacted by small amounts residual solvent that were not desorbed prior to the surface area measurement. The presence of residual solvent or other adsorbed species is not an issue in the TGA experiment.

The results indicate that the thermal stability of the Matrimid encapsulated polymer is very similar to that of the unencapsulated UiO-66 material. From an applied perspective, the thermal stability of the porous membrane is significant. Adsorbents are heated to remove pre-adsorbed species prior to operation, or to remove an adsorbed process gas during a cyclic adsorption separation. These materials in this application are thermally regenerated, and the data confirm that the porous membrane will not interfere with the selection of the regeneration temperature.

To examine the impact of the membrane and membrane formation process on the crystallinity of the MOF, PXRD data were collected (FIG. 7), and show that the unencapsulated and encapsulated pellet have PXRD patterns consistent with UiO-66. However, the data show an abnormality at 12° 2θ, which was attributed to the scanning of a rigid pellet versus flat powder. This occurred even though effort was made to level the surface of the pellet with the edge of the sample holder as described in the Experimental Section. The impact of pellet geometry on the PXRD single was confirmed by examining the PXRD pattern of a crushed pellet, which eliminated this abnormality. In all cases, the PXRD peaks are consistent with UiO-66. The data also show the pressing the powder into a pellet does not destroy the crystal structure of the material, which is consistent with other works that have examined pressed MOF pellets.

With the physical properties of the pellet determined, CO$_2$ adsorption isotherms were collected as shown in FIG. 8. The data show isotherm slopes and general shapes that are consistent with the unencapsulated MOF. When examined at low pressure, the data in FIG. 8f nearly overlap. At 1 bar the encapsulated pellet shows a 6.1, 4.9, and a 4.4% loss of CO$_2$ capacity at 0, 25, and 50° C. respectively. These results are important because they show that the capacity of the material has remained nearly the same as the unencapsulated pellet. As noted before, compression and use of PVA binders resulted in a reduction in surface area by 35-45%. A water adsorption isotherm at 25° C. was also collected (FIG. 9). The water adsorption isotherms of the unencapsulated and encapsulated pellets are similar with only a slight reduction in total capacity of the encapsulated material near saturation. These isotherm results are consistent with the membrane only comprising a small fraction of the total mass of the pellet, existing only on the surface of the pellet, and being porous. In the current formulation, if the MOF core was comprised of a water sensitive MOF, such as MOF-74, enhanced water stability of the MOF core would not be expected because the membrane has been designed to be porous. However, it is conceivable that a membrane-controlled porosity, or membrane with tailored hydrophobicity, could be used to provide kinetic water stability of a MOF material. A full study of such a system would need to include detailed mass transfer measurements and water stability analysis, which is outside the scope of the current work.

The multi temperature adsorption data were used to determine the isosteric heat of adsorption and to fit the adsorption isotherm data using a multi temperature Langmuir equation as shown below $$n(P, T) = \frac{n_s bP}{(1 + bP)} \quad (1)$$

$$b = b_0 \exp\left(\frac{B}{T}\right) \quad (2)$$

where, n is the loading in mmol/g, $n_s$ is the saturation capacity in mmol/g and considered to be constant for the temperature range, b is the adsorption affinity parameter defined by Eq. 2, and B is the parameter related to the heat of adsorption. The heat of adsorption was determined from the slope of a Van't Hoff plot (ln(p) vs 1/T) and was found to be constant as shown in Table 2. The heat of adsorption between both samples was similar with the Matrimid membrane-encapsulated sample being only 5.6% higher than that of the unencapsulated sample. The similar heat of adsorption is important from an applications perspective because it indicates that the amount of energy needed to remove adsorbed species from the MOF is effectively unchanged after adding the membrane. It is interesting that the heat of adsorption was higher as a result of the addition of the Matrimid, which indicates more favorable interaction with the membrane pores than the MOF. With only a 5.6% difference in the heat of adsorption, it is possible that the difference is within the range of the error of the data collected, or the error associated with the fitting of the data to a Langmuir equation, but a more detailed study would be required to determine how these differences vary with MOF and adsorbate selection.

Lastly, changes in the mechanical integrity of the pellet were evaluated. Increased mechanical stability was immediately observed because the pellets encapsulated with the porous membrane did not produce dust when being stored in glass vials. As shown in FIG. 10, when two pellets were placed in a vial and simply shaken by hand, dust from the unencapsulated pellet is readily observed whereas little if any dust is observed in the vial containing the Matrimid encapsulated pellets.

A more rigorous method was used to quantify these results using a planetary ball mill where pellets were agitated in a sealed vessel and the fines collected and weighed. As described in the experimental section of the manuscript, effort was made to ensure that only "dry" masses were used when quantifying the fines produced. Also, it is known in the art that adsorbed humidity has an impact on the mechanical stability of adsorbents. Therefore, care was taken in this process to ensure that the pellets were tested in a humidity controlled environment. In particular, the pellets were outgassed and then loaded into the ball-mill sample cups in a nitrogen filled glove-box (the sample cups contained a gasket around the lid). This approach ensured a dry environment above the pellets during ball mill agitation.

After the ball-mill step, the sorbent was collected and separated from the fines using a sieve, the adsorbent was outgassed again, and a dry weight after attrition was determined. This test was performed on both the encapsulated and unencapsulated pellets. The attrition results show a 96% reduction in the amount of fines produced when compared to the unencapsulated pellet (Table 3). As shown in FIG. 1, when the pellet was cut some of the Matrimid membrane can be seen either delaminating or being ripped from the surface of the pellet. The dusting results discussed here indicate that this delamination behavior only occurs when the pellet is being cut in half and not when the pellet is undergoing ball milling. When the reduction in fines is viewed in context of the minimal changes in the adsorption properties of the pellet, it can be concluded that membrane a MOF pellet with a porous membrane is a viable process for the production of mechanically stable MOF pellets.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

That which is claimed is:

1. A method of encapsulating a pellet in a porous membrane comprising the steps of: (i) dissolving a membrane solute in a membrane solvent to produce a membrane solution; (ii) applying said membrane solution to a pellet to form a pellet encapsulated with said membrane solution; (iii) subjecting said membrane solution that encapsulates said pellet to a phase inversion and; (iv) drying said pellet to form a porous membrane encapsulated pellet.

2. The method of claim 1 further comprising a step of cooling said porous membrane encapsulated pellet.

3. The method of claim 1 wherein said subjecting step (iii) further comprises agitating said pellets encapsulated with said membrane solution during the subject step (iii) to enhance said phase inversion.

4. The method of claim 1 wherein steps (ii) through (iv) are performed in sequence at least two times.

5. The method of claim 4 wherein steps (ii) through (iv) are performed in sequence two times.

6. The method of claim 1 wherein said pellet is an adsorbent pellet or a catalysis pellet.

7. The method of claim 1 wherein said pellet comprises a crystalline material or an amorphous material.

8. The method of claim 1 wherein said pellet comprises a metal organic framework compound.

9. The method of claim 1 wherein said pellet comprises a zeolite compound.

10. The method of claim 1 wherein said pellet comprises a binding agent.

11. The method of claim 10 wherein said binding agent comprises a clay or polymer.

12. The method of claim 1 wherein said membrane solute is a polymer.

13. The method of claim 12 wherein said polymer is a thermoplastic polymer.

14. The method of claim 13 wherein said thermoplastic polymer is a poly(imide).

15. The method of claim 14 wherein said poly(imide) is obtained by the polycondensation of 3,3',4,4'-benzophenone tetracarboxylic dianhydride (BTDA) and a mixture of two rigid cycloaliphatic indane-type monomers, 5- and 6-amino-1-(4'-aminophenyl)-1,3,3-trimethylindane.

16. The method of claim 12 wherein said polymer is selected from the group consisting of poly(vinyl acetate), poly(ether imide), poly(imide), polybenzimidazole and combinations thereof.

17. The method of claim 1 wherein said membrane solvent comprises N,N-dimethyl formamide.

18. A porous membrane encapsulated pellet formed by the method of claim 1.

* * * * *